Jan. 5, 1954

T. B. DARLINGTON 2,664,692

PICKER FOR CRANBERRIES AND THE LIKE

Filed Feb. 20, 1951

INVENTOR
Thomas Brinton Darlington.
BY
ATTORNEYS

Jan. 5, 1954 T. B. DARLINGTON 2,664,692
PICKER FOR CRANBERRIES AND THE LIKE
Filed Feb. 20, 1951 4 Sheets-Sheet 2
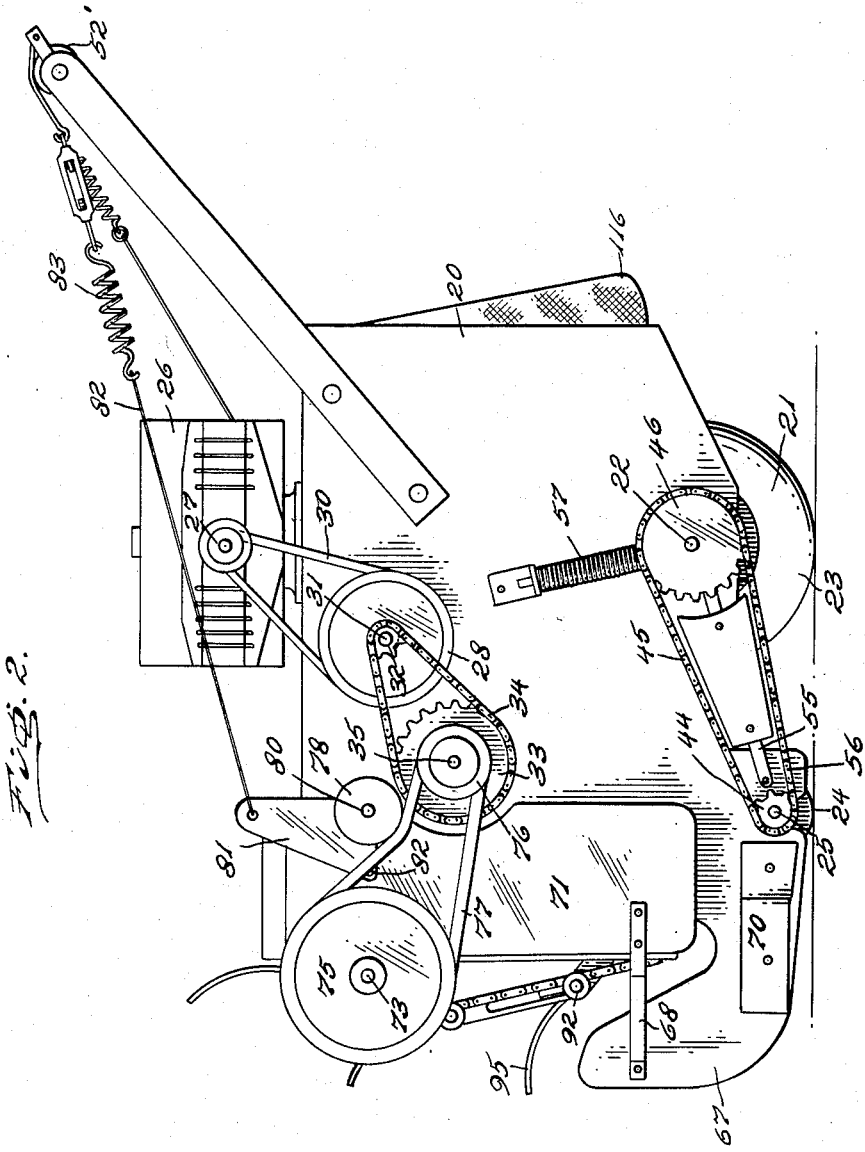
Fig. 2.
INVENTOR
Thomas Brinton Darlington.
BY
ATTORNEYS Jan. 5, 1954
T. B. DARLINGTON
2,664,692
PICKER FOR CRANBERRIES AND THE LIKE
Filed Feb. 20, 1951
4 Sheets-Sheet 3
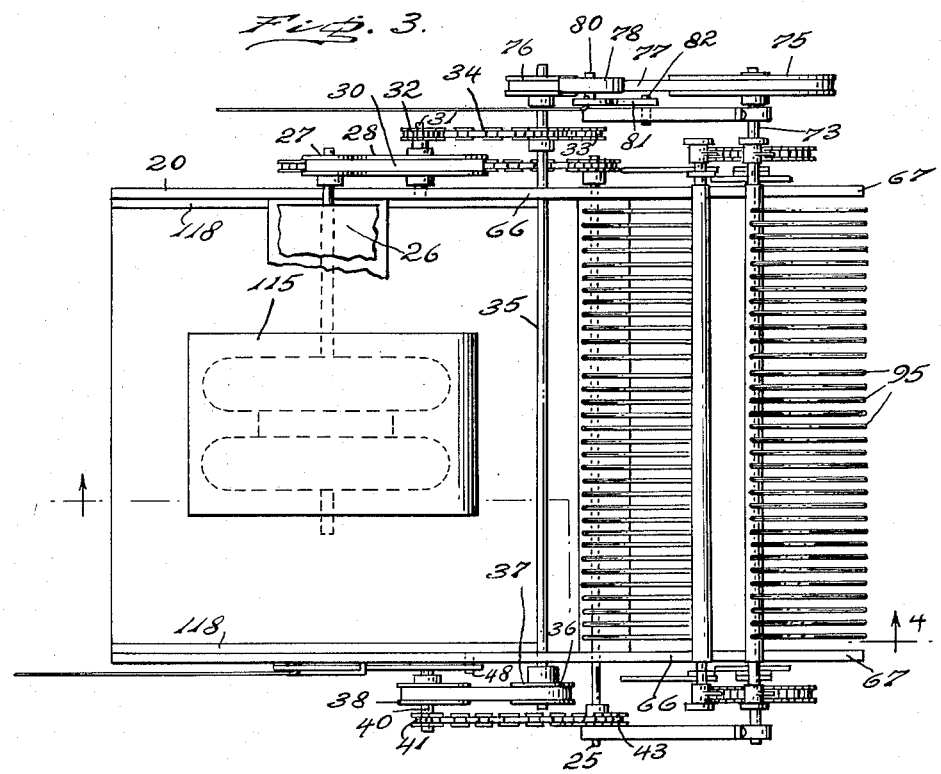
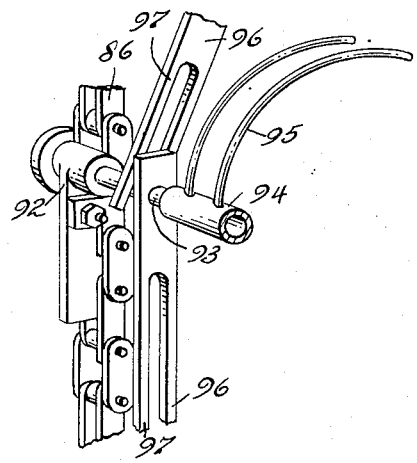
INVENTOR
Thomas Brinton Darlington.
BY
ATTORNEYS Jan. 5, 1954   T. B. DARLINGTON   2,664,692
PICKER FOR CRANBERRIES AND THE LIKE
Filed Feb. 20, 1951   4 Sheets-Sheet 4
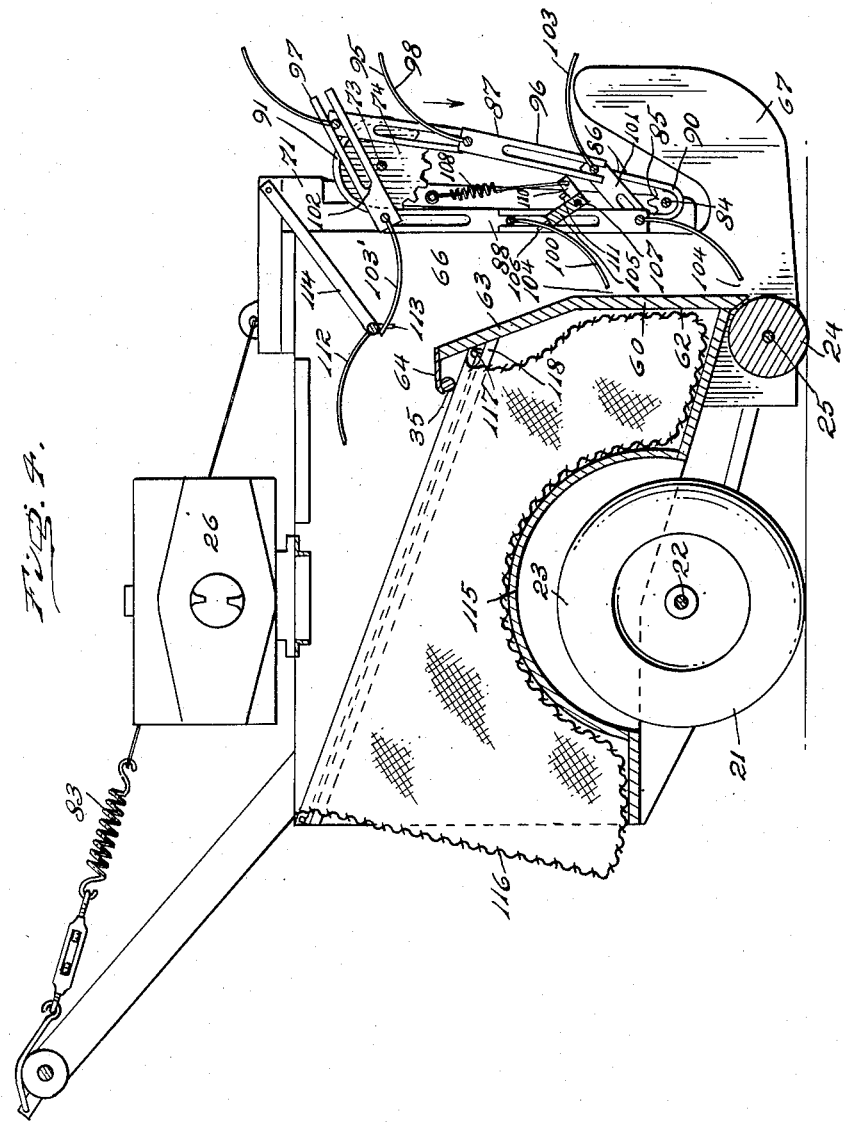
INVENTOR
Thomas Brinton Darlington.
BY
ATTORNEYS Patented Jan. 5, 1954

2,664,692

UNITED STATES PATENT OFFICE 2,664,692

PICKER FOR CRANBERRIES AND THE LIKE

Thomas Brinton Darlington, Whitesbog, N. J.

Application February 20, 1951, Serial No. 211,893

8 Claims. (Cl. 56—330)

The present invention relates to agricultural pickers, and especially to pickers for cranberries.

A purpose of the invention is to obtain a greater yield by mechanical picking of cranberries, avoiding to a greater extent the tendency of prior pickers to crush the berries, leave them on the vine or cause them to drop to the ground.

A further purpose is to obtain greater storage capacity in a picker for cranberries and the like.

A further purpose is to obtain closer conformity to the ground configuration, and more reliably to follow the lower level at which cranberries grow, minimizing the destructiveness to cranberry vines from mechanical pickers. In this case the invention is useful in reducing vine breakage and also minimizing the amount of uprooting of vines which takes place.

A further purpose is to make the height of picking adjustable in a manner which will be convenient to the operator, and will not require the operator to hold a manual adjustment.

A further purpose is to increase the maneuverability of a cranberry picker and reduce the ground pressure, obtaining better flotation on cranberry bogs with the tires employed.

A further purpose is to pick a cranberry bog without relation to the direction of pruning, or the direction of previous picking.

A further purpose is to pick cranberries by a downward and rearward comb sweep on a conveyor and then to move the comb up along a picking wall which prevents the berries from escaping from the combs.

A further purpose is to hold the vines during picking by a roller at the bottom of the picking wall and desirably having the picking wall in tangential relation, so that the vines will be partially or wholly under the pressure of the roller when the comb makes its picking sweep.

A further purpose is to feather the combs on the conveyor except near the position of the reverse bends of the conveyor and to swing the combs outwardly from the conveyor adjoining the reverse bends.

A further purpose is to accomplish the feathering by feathering levers which extend forwardly and interlock with the conveyor in forward position, the feathering lever determining the pivoting of the combs.

A further purpose is to divert the picking wall upwardly and rearwardly adjoining the position of outward movement of the combs at the upper reverse bend, using this outward movement to throw the berries over the picking wall.

A further purpose is to clear the picking combs of vines by a cleaning comb which engages between the teeth of each picking comb as the picking comb moves upward in trailing relationship.

A further purpose is to provide a discharging comb near the top of the rear stretch which engages between the teeth of the picking comb and diverts the berries from the picking combs.

A further purpose is to provide side guards extending forwardly and upwardly at the position of the picking sweep of the picking combs.

Further purposes appear in the specification and in the claims.

In the drawings I have chosen to illustrate one only of the numerous embodiments in which my invention may appear, choosing the form shown from the standpoints of convenience in illustration, satisfactory operation and clear demonstration of the principles involved.

Figure 2 is a left side elevation thereof.

Figure 3 is a top plan view partially broken away.

Figure 4 is a section on the line 4—4 of Figure 3.

Figure 5 is a fragmentary perspective view on an enlarged scale showing the conveyor mechanism including the feathering levers.

Figure 1:
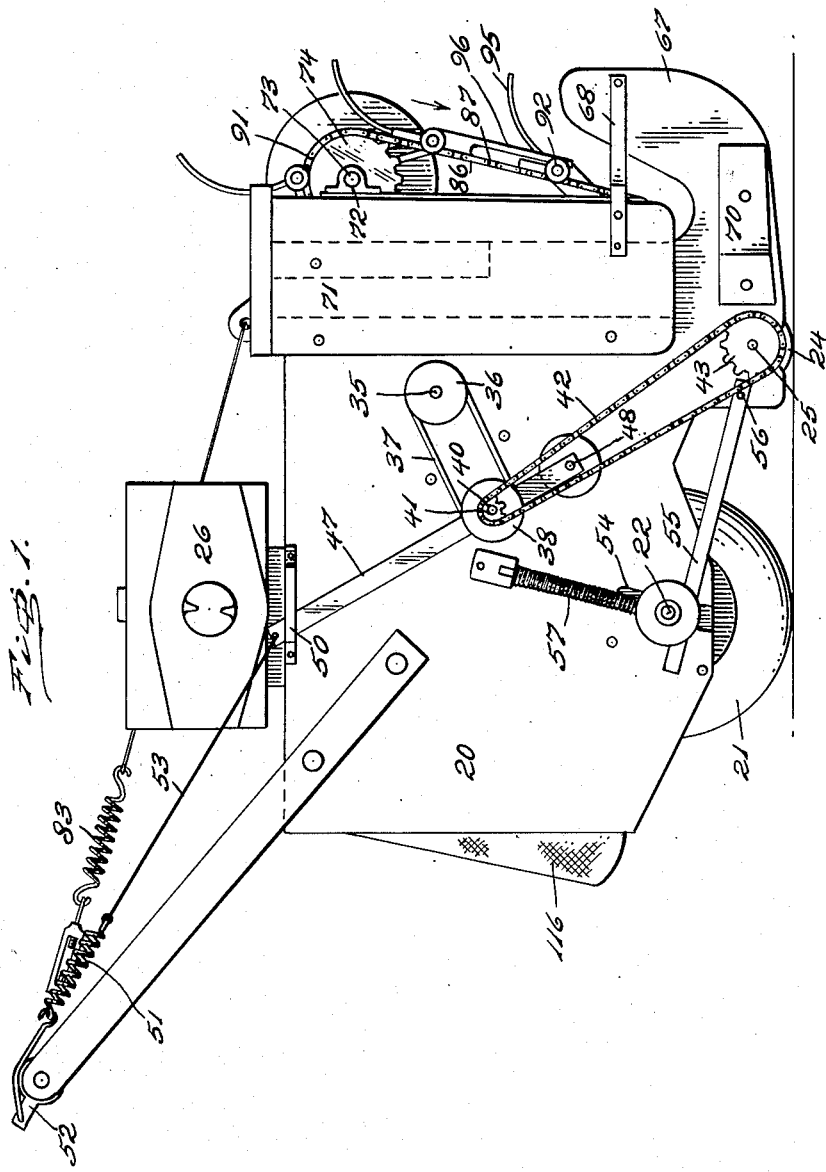
Figure 1 is a right side elevation of the cranberry picker of the invention.

Describing in illustration but not in limitation and referring to the drawings:

The picking of agricultural products such as berries constitutes a major expense in many agricultural operations, and this is particularly true in the raising of cranberries. The picking problem is here especially difficult because of the bog conditions under which cranberries are grown, making hand picking difficult and unpleasant, and adding greatly to the problem of mechanical picking.

Previous mechanical pickers have suffered from several limitations. The operation has often been cumbersome and difficult, and the results far from satisfactory due to the low yield, the large amount of destruction of vines, the poor maneuverability of the pickers and the necessity in many prior devices of picking in a certain direction, such as the direction of pruning and previous picking.

In accordance with the present invention, an improved picker has been devised which increases the yield, by picking more thoroughly and reducing the amount of crushing of the berries, which is readily adjustable as to the height of picking without imposing any pull on the operator to maintain the adjustment, and which is not destructive to the vines. The picker of the present invention has large storage capacity. It is unusually maneuverable. It picks in any direction and not merely in the direction of previous pruning or picking.

In accordance with the invention, the picker is provided with a forwardly directed picking wall, and a conveyor carrying picking combs makes a downward and rearward sweep through the vines and then travels upwardly along the picking wall with the ends in proximity less than the berry size to the picking wall, and then discharges into a hopper.

The vines are pressed downwardly at the bottom of the picking wall by a roller, and thus the tendency to uproot the vines is minimized.

The picking combs are feathered along the conveyor and near the reverse bends they make abnormal outward sweeps, which at the lower reverse bend accomplishes the picking and at the upper reverse bend discharges the berries from the picking comb. The feathering and the abnormal outward sweeps are accomplished by feathering levers which interconnect the particular comb with a portion of the conveyor removed longitudinally therefrom and desirably forwardly placed, for example the position of the next forward picking comb.

The picking wall is desirably upwardly and rearwardly deflected toward the top to provide for the discharging sweep of the picking comb.

The clearing of vines from the picking comb is aided by a cleaning comb which is suitably located between the front and rear stretches of the conveyor, and extends into the trailing teeth of the conveyor as the picking comb moves upward. The discharge is also desirably aided by a discharging comb which engages the picking comb at the top adjacent the point of discharge and tends to clear berries as well as vines and debris from the picking comb.

Side guards extend forwardly and suitably upwardly at the sides of the picking comb adjoining the point of picking sweep.

Considering now the construction of the vehicle in detail, a vehicle body 20 suitably of generally rectangular construction, is mounted on a pair of rear wheels 21 secured on suitable axles 22 positioned on the vehicle as later explained and carrying suitably pneumatic rubber tires 23. The wheels turn with the axles in suitable bearings not shown. Forwardly of the wheels 21 a roller 24 suitably of rubber or rubber covered, extends across the vehicle and is secured on an axle 25 journalled in the frame. A suitable engine, for example a comparatively light internal combustion engine 26, drives the vehicle, the drive being accomplished by a pulley 27 (Figure 2) driving a suitable speed reducing pulley 28 by a belt 30. The pulley 28 is on a stub shaft 31 suitably journalled in the body. The stub shaft carries sprocket 32 which drives speed reducing sprocket 33 by chain 34. The sprocket 33 is on shaft 35 extending across and suitably journalled in the frame. At the opposite end, shaft 35 carries pulley 36 which interconnects by belt 37 with pulley 38. Pulley 38 is mounted on stub shaft 40 suitably journalled in the frame, and carrying sprocket 41 which interconnects by chain 42 with sprocket 43 on one end of roller axle 25. Axle 22 on which the wheels 21 are mounted is interconnected for driving purposes with roller 24 by sprocket 44 (on the opposite end from sprocket 43 of roller axle 25), by chain 45 and sprocket 46 on wheel axle 22.

Stub shaft 41 carrying pulley 38 is journalled on clutch lever 47 pivoted on the frame at its remote end 48 and movable at its far end in a guide 50. The clutch lever when thrown to the right in Figure 1 relieves tension on belt 37 and causes the wheels to idle, and when thrown to the left (the position shown in Figure 1), tensions the belt, desirably under the action of tension spring 51 acting from handle 52 at the back of the vehicle through cord 53 which is attached to the end of the clutch lever 47.

The axle 22 is pivoted and extends through arcuate adjustment slots 54 in the body and is swingably mounted on adjustment levers 55 pivoted at 56 at their opposite ends on the frame. Compression springs 57 counterbalance the axle.

At the front of the vehicle as best seen in Figure 4 a picking wall 60 extends generally vertically, consisting of a lower upright portion 62 and an upper upwardly and rearwardly extending portion 63, terminating in a top lip 64 which extends over shaft 35.

The picking wall is substantially tangential to roller 24 as best seen in Figure 4 so that the roller will grip the vines while picking takes place.

On either side of the picking wall, side walls 66 extend forwardly beyond the picking wall and at the bottom these side walls have further forward and upward extensions in the form of side guards 67 as best seen in Figures 1, 2 and 3 and 4, which desirably resemble horns and extend along the sides of the conveyor at the position of the picking sweep. These side guards are braced from the frame at 68. A guard 70 keeps vines from tangling in sprocket 44.

Extending forward at either side of the main frame are side plates 71 which mount journals 72 (Figure 1) on which a cross top sprocket shaft 73 has bearing support near the top and front of the vehicle. The top sprocket shaft carries sprockets 74 at opposite ends, and at one end has a pulley 75 which interconnects with a pulley 76 on shaft 35 by belt 77.

The belt is normally loose enough to slip and to apply power to the conveyor to be described. The belt is tensioned by pulley 78 (Figure 2), journalled on an idler shaft 80 mounted on clutch plate 81 pivoted at 82 on one of the side plates 71. The pulley 78 is urged toward driving position by cord 82 and tension spring 83 acting from handle 52' (Figure 2). Positioned below and suitably somewhat behind sprockets 74 is a lower sprocket stub shaft 84 (one on each side of the machine) journalled on the side plates, and at the inner end carrying a sprocket 85 on each stub shaft.

Chains 86 at the two sides connect the upper and lower sprockets to form a conveyor having a forward downwardly moving stretch 87, a rearwardly upwardly moving stretch 88, a bottom reverse bend 90 and a top reverse bend 91.

Picker combs are journalled on journals 92 secured at spaced intervals (3 to 10, 6 positions being shown) along the chains. The picker comb journals, as best seen in Figure 5, journal picker comb shafts 93 which extend across from the journal on one chain across to the journal on the other chain. The picker comb shafts desirably have tubular intermediate portions 94 which support suitably resilient comb teeth 95, desirably of arcuate form as shown in Figure 5, with the concavity or hollow of the arc forwardly directed. The picking comb teeth are suitably of spring wire such as spring steel, Phosphor bronze or other suitable spring material which will yield readily when it encounters an obstruction. The spacing of the picking comb teeth is of course less than the size of the cranberry so that the cranberry will be held by the comb.

The picking combs are feathered and angularly manipulated with respect to the conveyor by manipulating the shafts 93. Each of the shafts has secured thereon a feathering lever 96, which, while it may be provided at only one end, is best provided at both ends of the picking combs suitably inside or toward the center of the vehicle with respect to the conveyor chains. The feathering levers have elongated longitudinal prongs 97 at their outer ends which function as cam means and extend around some suitable forward point on the chain means, desirably the picking comb shaft 93 of the next forwardly placed picking comb, which acts as a follower. Thus the effect of the picking comb levers is to influence the position of the picking comb in response to what is happening to the next forward picking comb with respect to the straightness or bending of the chain at that point.

When the chain is substantially straight the picking comb is in a trailing position extending diagonally outwardly as seen for example at 98 on the down stretch and at 100 on the up stretch in Figure 4. When the reverse bend approaches, the feathering lever is thrown to a position 101 as shown at the bottom or 102 as shown at the top at an angle to the chain (Figure 4). This causes the picking comb to leave its feathered position and undergo a sweep outwardly with respect to the chain, and the outer ends of the picking comb move at that position much more rapidly than the chain. Thus as shown in Figure 4 the picking comb at 103 is undergoing a downward and rearward picking sweep under the influence of its feathering levers at 101. Likewise at the top the picking comb at 103' has been going through a discharging sweep in which it also has swung outwardly and moved more rapidly than the chain.

Both of these sweeps take place in advance of the completion of the reverse bend of the chain, since the feathering levers are aligned straight with the chain as the picking comb comes out of the reverse bend at the forward side. Therefore this abnormal sweep in the arrangement shown is primarily encountered as the picking comb approaches the reverse bend and begins to move through the reverse bend, and is not encountered as the picking comb leaves the reverse bend.

It will be evident that on the rear upward stretch of the conveyor, the space 104 between the picking wall 60 and the outer ends of the picking combs is less than the size of a cranberry so that cranberries which are picked by the picking sweep of the comb 103 moving downwardly and rearwardly are carried upwardly along the picking wall. Due to the velocity of motion these berries are carried upwardly, and the ends of the picking comb move outwardly away from the conveyor along the rearwardly and upwardly deflecting portion 63 of the picking wall as the picking comb swings outwardly at 103'.

A cleaning comb 105 is positioned inside the conveyor extending across between the front and rear stretches of the chain, with resilient teeth 106 extending outwardly and engaging the spaces between the trailing upwardly moving picking combs, and this moves tangled vines from the base of the picking combs toward the tips of the teeth to a point at which they can be reached by the discharging comb and pushed into the hopper. The cleaning comb 106 is pivoted on shaft 107 between the conveyor stretches and is spring-urged to engage the picking comb by tension spring 108 on the frame pulling lever 110 on the side of the cleaning comb against stop 111 on the frame.

To further aid in clearing vines from the picking combs and aid in discharging berries, the picking combs at the position 103' encounter a discharging comb 113 which extends out downwardly into the path of the picking comb and engages the upper surface of the teeth of the picking comb near the end, pulling vines out of the picking comb and discharging berries. A resilient sheet guard 112 of rubber or the like extends rearwardly with respect to the top of discharging comb to deflect berries into the hopper. Arms 114 extending diagonally rearwardly from the frame support the discharging comb and the sheet guard.

Once the berries pass over the picking wall they enter a hopper 115 where they are held until a suitable quantity for discharge is reached. The hopper contains a fabric bag 116 having a metallic frame 117 at the upper edge supported on rails 118 and bodily removable through the open back to be replaced by another bag.

In operation it will be evident that the vehicle is started by moving the clutch lever 47 to the position to tension belt 37 and thus drive the front roller 24 and the rear wheels 21. If the height of the lower part of the picking conveyor is not properly adjusted for the particular conditions, this is changed by pressing downward more or less on the handles 52 and 52' and thus raising or lowering the rear and tilting the conveyor down or up.

With the vehicle in motion the picking conveyor is operated by applying tension of the pulley 78 on the belt 77.

The picking combs move down on the front stretch of the conveyor in trailing position, and as they approach the position 103 adjoining the side guards the picking combs leave their trailing or feathered position and begin to move in an outward, downward and rearward sweep through the vines, placing the teeth of the comb under the berries. When the picking comb begins its upward travel in the rear stretch of the conveyor, the berries are pulled off the vines and the vines in the main pull out of the picking combs. The berries are held by the picking comb or ride up against the picking wall held by the ends of the picking comb teeth.

During the picking sweep the vines are engaged by the pressure of the roller 24 against the ground which minimizes or reduces the tendency to uproot the vines.

As the picking combs move upwardly along the picking wall the berries are carried to a point near the top of the picking wall at which the picking comb begins a discharging sweep, in which it leaves its feathered position and moves outwardly and rearwardly. Berries are thus discharged into the hopper by a tossing motion.

The tendency of tangled vines to remain in the teeth of the picking comb is overcome by the cleaning comb 105 which engages between the teeth of the picking comb as the picking comb travels upwardly in trailing position as shown in Figure 4. Likewise the clearing of vines and discharge of berries is aided by the discharging comb 113, and the throwing of berries upwardly during discharge is prevented by sheet guard 112.

It will thus be evident that picking is accomplished with a minimum of vine damage and very little tendency to uproot the vines. The movement of the picking comb through the vines being downward and rearward, tends to accomplish very complete picking and results in very little damage to the berries.

The device is highly maneuverable since the rear wheels are close together, and comparatively close to the front roller and the device can turn very readily to zig-zag back and forth across the cranberry bog. At any time that the picking height is to be adjusted, this can readily be done by adjusting the position of the back of the picker, thus tilting the picking conveyor up or down.

The storage capacity is large and it is not necessary to discharge the hopper frequently.

The operator can pick without regard to the direction of previous picking or pruning, and thus the need for skill in operation is greatly reduced.

The tangency of the roller 24 with respect to the picking wall assures maximum protection of the vines. The portions of the vines actually under the roller are of course those which have previously been picked, or those which are so close to the ground that they normally will not carry berries.

In view of my invention and disclosure variations and modifications to meet individual whim or particular need will doubtless become evident to others skilled in the art, to obtain all or part of the benefits of my invention, without copying the structure shown, and I, therefore, claim all such insofar as they fall within the reasonable spirit and scope of my claims.

Having thus described my invention what I claim as new and desire to secure by Letters Patent is:

1. In a harvester for cranberries and the like, a vehicle, a roller adapted to contact the ground rotatably mounted on the vehicle, a generally vertical picking wall extending upwardly on the vehicle tangent to the roller from immediately adjacent the forward edge of the roller, and a generally vertical conveyor mounted on the vehicle in front of the picking wall having a plurality of movable picking combs disposed along the conveyor, the conveyor having a front stretch which is more remote from the picking wall, a rear stretch which is adjoining the picking wall and a reverse bend at the bottom, and means on the vehicle for moving the conveyor in a direction in which the front stretch moves downwardly and the rear stretch moves upwardly, the combs at the reverse bend at the bottom moving downwardly and rearwardly and the outer ends of the combs on the rear stretch being in proximity less than berry size to the picking wall.

2. In a harvester for cranberries and the like, a vehicle, a ground contacting roller rotatably mounted on the vehicle at one end adapted to be the forward end in motion of the vehicle, a generally vertical picking wall on the vehicle extending tangent to the roller from a point immediately adjoining the roller, a conveyor on the vehicle generally vertical in front of the picking wall with respect to the roller having a plurality of picking combs disposed along the conveyor and pivotally connected to the conveyor, having relatively forward and relatively rearward stretches with respect to the roller and a return bend at the bottom, means on the vehicle for moving the conveyor in a direction which brings the forward stretch down and the rearward stretch up, the outer ends of the combs being in proximity less than berry size with respect to the picking wall on the rearward stretch, a cam element connected with each of the combs and adapted to swing the comb with respect to the conveyor, means on the conveyor for moving the cam element into a position to feather the combs in a diagonal trailing relationship on the front and rear stretches and means on the conveyor for moving the cam element into a position for swinging the combs outwardly with respect to the feathering position at the reverse bend at the bottom between the front and rear stretches.

3. In a harvester for cranberries and the like, a vehicle, a ground contacting roller on the vehicle at an edge adapted to be a forward edge of the vehicle in motion, a generally vertical picking wall on the vehicle extending from immediately adjacent to the roller tangent to the roller above the roller and having an upwardly and rearwardly sloping portion toward the top thereof, a generally vertical conveyor on the vehicle in front of the picking wall with respect to the roller having a plurality of combs pivotally disposed along the conveyor, having a front stretch, a rear stretch and reverse bends at the top and bottom of the conveyor, means on the vehicle for moving the conveyor in a direction which carries the front stretch downward and the rear stretch upward, a cam on each of the combs, means on the conveyor for moving the cams into a position in which the combs are diagonally trailing on the rear stretch, means on the conveyor for moving the cams into a position in which the combs are swung outwardly with respect to the trailing position at the bottom of the conveyor and means on the conveyor for moving the cams into a position in which the combs are swung outwardly with respect to the trailing position opposite the rearward and upwardly extending portion of the picking wall.

4. In a harvester for cranberries and the like, a vehicle, a generally vertical picking wall at one end of the vehicle, upper and lower sprockets mounted on the vehicle on the side of the picking wall remote from the rest of the vehicle, chain means extending around the sprockets and forming a front stretch remote from the picking wall and a rear stretch adjacent the picking wall, means on the vehicle for moving the chain means in a direction in which the front stretch moves downward and the rear stretch moves upward, combs pivotally mounted on the chain means at spaced positions, a feathering lever extending from each comb, the feathering levers having cam portions, followers on the chain means interconnected with the cam portions of the feathering levers and thereby manipulating the feathering levers and the combs in accordance with the direction of travel of the chain forwardly of a particular comb, the outer ends of the combs being in proximity less than berry size with respect to the picking wall on the rear stretch, whereby the combs are in diagonal trailing position on the rear stretch and at the reverse bend near the bottom of the chain means the combs swing outwardly and toward the picking wall.

5. In a harvester for cranberries and the like, a vehicle, a generally vertical picking wall at one end of the vehicle adapted to be the forward end and having sprockets on the vehicle at the top and bottom on the side of the picking wall remote from the rest of the vehicle, chain means on the sprockets forming a vertical front stretch more remote from the picking wall and a vertical rear stretch adjacent the picking wall with reverse bends around the sprockets, means on the vehicle for driving the conveyor in a direction in which the front stretch moves downward and the rear stretch moves upward, picking combs individually pivotally mounted at spaced positions along the chain means, feathering levers extending forwardly with respect to the direction of motion of the conveyor from the picking combs and having cam means, followers on the conveyor engaging the cam means and manipulating the combs in accordance with the motion of the chain means forwardly of the particular comb, the outer ends of the combs being in proximity less than berry size with respect to the picking wall, the combs being set with respect to the cam levers with the combs in feathered trailing position when the chain forwardly of the particular comb is straight and the combs thereby swinging outwardly whenever the chain means approaches a reverse bend.

6. In a harvester for cranberries and the like, a vehicle having a generally vertical picking wall at one end adapted to be the forward end, a conveyor mounted on the vehicle on the side of the picking wall remote from the rest of the vehicle, having a plurality of movable picking combs along the conveyor, the conveyor being disposed vertically, means on the vehicle for moving the conveyor in a direction in which the conveyor stretch more remote from the picking wall goes downwardly and the conveyor stretch adjacent the picking wall goes upwardly, the outer ends of the combs being in proximity less than the berry size with respect to the picking wall during the upward movement, and a comb positioned between the front and rear stretches engaging the picking combs having teeth extending rearwardly into the space between the teeth of the picking combs at the stretch adjacent the picking wall.

7. In a harvester for cranberries and the like, a vehicle having a generally vertical picking wall at one end adapted to be the forward end, a generally vertical conveyor positioned on the vehicle on the side of the picking wall remote from the rest of the vehicle and having a plurality of movable picking combs pivotally mounted at spaced positions along the conveyor, the conveyor having a stretch more remote from the picking wall and a stretch adjacent the picking wall, means on the vehicle for moving the conveyor in a direction in which the stretch more remote from the picking wall moves downward and the stretch adjacent the picking wall moves upward, the outer ends of the combs being in proximity less than the berry size with respect to the picking wall on the upwardly moving stretch, feathering levers extending from the picking combs in the direction forwardly with respect to the conveyor motion and having cam means thereon, followers on the conveyor interconnecting with the cam means and moving the feathering levers and the combs according to the direction of the conveyor forward of a particular comb, the feathering levers being disposed with respect to the comb to place the comb in diagonal trailing position when the conveyor is straight and to move the comb outwardly when the conveyor in advance of the comb makes a bend.

8. In a harvester for cranberries and the like, a vehicle having a vertical picking wall at one end adapted to be the forward end, a generally vertical conveyor on the vehicle on the side of the picking wall remote from the rest of the vehicle having a plurality of pivotally mounted picking combs disposed along the conveyor, the conveyor having two stretches, one relatively remote from the picking wall and one adjacent the picking wall, means on the vehicle for driving the conveyor in a direction in which the stretch remote from the picking wall goes downward and the stretch adjacent the picking wall moves upward, the outer ends of the combs moving in proximity less than the berry size with respect to the picking wall, feathering levers on the combs extending in the direction of forward movement of the conveyor and having cam means thereon, followers on the conveyor engaging the cam means and moving the feathering levers in accordance with the movement of the conveyor forward of a particular comb, the feathering lever being disposed with respect to the picking comb to maintain the picking comb in feathered trailing position when the conveyor is straight and to move the picking comb out when the conveyor makes a reverse bend, and a discharging comb mounted on the vehicle engaging the teeth of the picking comb at the upper reverse bend as the picking comb at that point moves outwardly.

THOMAS BRINTON DARLINGTON.

References Cited in the file of this patent

UNITED STATES PATENTS

| Number | Name | Date |
|---|---|---|
| 30,064 | Hemminway | Sept. 18, 1860 |
| 159,316 | Fulton | Feb. 2, 1875 |
| 880,104 | Schiller | Feb. 25, 1908 |
| 1,572,025 | Maglathlin | Feb. 9, 1926 |
| 1,907,467 | Tervo et al. | May 9, 1933 |
| 2,447,122 | Horst, Jr. | Aug. 17, 1942 |